United States Patent
Aharon

(10) Patent No.: US 6,345,129 B1
(45) Date of Patent: Feb. 5, 2002

(54) WIDE-FIELD SCANNING TV

(76) Inventor: Oren Aharon, 4 Klil-Hahoresh, Vardi, Haifa (IL)

( * ) Notice: Subject to any disclaimer, the term of this patent is extended or adjusted under 35 U.S.C. 154(b) by 0 days.

(21) Appl. No.: 09/243,533

(22) Filed: Feb. 3, 1999

(51) Int. Cl.[7] .................................................. G06K 9/36
(52) U.S. Cl. ....................... 382/284; 382/295; 382/294; 348/239
(58) Field of Search .................. 382/284, 282, 382/287, 294, 291, 293, 295, 286; 345/656, 667; 348/239, 369; 356/485

(56) References Cited

U.S. PATENT DOCUMENTS

| | | | |
|---|---|---|---|
| 4,223,346 A | * | 9/1980 | Neiheisel et al. ........... 235/462 |
| 4,543,601 A | | 9/1985 | Harada et al. |
| 4,581,649 A | | 4/1986 | Morokowa |
| 4,652,928 A | | 3/1987 | Endo et al. |
| 4,928,174 A | | 5/1990 | Smith |
| 4,998,164 A | | 3/1991 | Endo et al. |
| 5,063,450 A | | 11/1991 | Pritchard |
| 5,206,503 A | | 4/1993 | Toops |
| 5,315,411 A | | 5/1994 | Blanding |
| 5,814,803 A | * | 9/1998 | Olmstead ..................... 235/462 |
| 5,999,147 A | * | 12/1999 | Teitel ............................. 345/8 |
| 6,104,840 A | * | 8/2000 | Ejiri et al. ................... 382/284 |

* cited by examiner

*Primary Examiner*—Joseph Mancus
*Assistant Examiner*—Yosef Kassa
(74) *Attorney, Agent, or Firm*—Browdy and Neimark

(57) ABSTRACT

A method and apparatus electronically correct real image distortions caused by lens defects, designed-in distortions (fish-eye lenses), and angular distortion (due to trigonometry, and present in all lenses). The distorted images is directly detected by a photo-sensor array (e.g. a CCD image pickup) as pixel data representing the distorted image; optionally the lens is scanned over a small CCD array to generate different images. The raw image data is downloaded to a computer, in which special software corrects the distortions and reconfigures each raw image onto a virtual spherical surface. The corrected images are juxtaposed to build up a composite virtual image on the virtual sphere. Data representing the virtual image can be transformed back to a flat display surface for viewing any portion of the composite scene without distortion and without discontinuities between juxtaposed images.

18 Claims, 4 Drawing Sheets

WIDE-FIELD SCANNING TV

FIELD OF THE INVENTION

The present invention relates to correcting distortion in images by computer, and to scanning wide fields of view by moving a lens over a detections system.

REVIEW OF THE RELATED TECHNOLOGY

An electronic camera uses a conventional lens but in place of film employs an array of electronic light sensor elements such as CCD's (charge coupled devices). Typically the array is rectangular. Signals from the respective sensors may be converted directly into an image on a display, for example a corresponding rectangular array of LED's (light emitting diodes). The sensor signals may also be stored in a computer memory, or processed by a computer CPU.

Conventional cameras using electronic pickup arrays are known in which a small sensor array is movable about the image plane. Such cameras cover a wider field of view, with a given lens, than would otherwise be possible. One example is described by Topps in U.S. Pat. No. 5,206,503. The sensor array, smaller than the usable focal plane area of the lens, is movable within the image plane in two directions, denoted X and Y. If the sensor array is coupled to a TV, the image translates as the sensor undergoes X-Y motion, even when the lens is stationary.

Very similar to Topps is U.S. Pat. No. 4,928,174 to Smith. Smith discloses a surveillance camera providing a narrow field of view, i.e. a relatively high magnification, with a lens focussing on a relatively small CCD array for video pickup. The CCD array is movable, within the focal plane, to change the view. FIGS. 6a–6c of Smith show the basic idea. The movable video pickup (CCD array) provides a mechanical improvement over the more conventional method of moving the entire camera body around because the sensor array is smaller, better protected, etc.

Although it is not of concern to Smith, the images from Smith's movable-pickup camera are not exactly the same as those provided by the more conventional swivelling-body camera in which the lens, and its optical axis, change direction. This is because of perspective.

When an amateur photographer takes a picture of a tall building, invariably the camera is tilted up: both the optical axis of the lens and the film at an angle. On the resulting photograph the building is in the shape of a triangle, with its parallel sides inclined on the paper. (The same effect is seen in a photograph taken of railroad tracks when the camera lens optical axis is parallel to the tracks: they converge to the horizon on the photographic print, even though they are of course actually parallel.)

In contrast, an architectural photographer may take a picture of the same building, from the same vantage point, but using a view camera having adjustments not available on other cameras. These adjustments allow the lens's optical axis to remain horizontal and permit the film to move downward while the film plane remains perpendicular to the lens axis. In the resulting photograph the sides of the building appear as they are, parallel.

The more conventional surveillance camera, in which the axis tilts, provides a perspective like that of the nonadjustable camera, while Smith's movable-pickup camera mimics the professional view camera and provides a different perspective.

Smith does not comment on this perspective difference, and for simple surveillance purposes with moderate lenses the perspective is not crucial. However, in the case of an extreme-wide angle lens and a pickup movable to positions far off the optical axis, the distortion produced would become noticeable. Photographs taken with extreme wide-angle lenses, e.g. a 15-mm lens on a 35-mm camera, appear distorted even when the lens actually has no "distortion" in the sense used by opticians or lens designers. (An optician considers a lens to distort when the rays from objects to the corresponding points on the image plane does not all pass through a single point inside the lens, that is, when the angle of the image point off the optical axis is the same as the angle of the object point off the optical axis. Such distortion causes a straight object to have a curved image. "Pin-cushion" and "barrel" distortions are examples.)

Moreover, even if the lens is optically perfect (without opticians' distortion) and the angle is not extreme, the images from different lens positions do not correlate. For example, suppose a person is photographing a mountain scene with a camera having a horizontal field of view of 30°. She takes a picture with the camera pointed north, then another with the camera pointed 30° to the east, then another pointed 60° to the east, and so on. She prints the pictures and then constructs a panorama by aligning the edges of the pictures. It will be found that the photograph images do not correlate correctly at the photograph borders.

To be more precise, there will be a point-to-point matchup at the border between two photographs, so that a line crossing the border (e.g. a telephone wire) will meet there. But the angles of the line in the two photos will be different: objects which are actually straight will appear to bend at the border. This effect will be referred to as "angular distortion".

It will be found that angular distortion becomes worse as the field of view increases If the photographer in the example above had used a camera with a 45° field of view and shoot pictures at 45° increments, the distortion would be worse. If a telephoto lens having a narrow field were used, the effect would be negligible and the photographs could be juxtaposed without noticeable angular distortion.

Because of this effect, panoramic cameras confine the film to one vertical strip at the image plane and rotate the camera to provide a continuous change in the azimuthal angle of the lens optical axis. This avoids the sharp bends in the images of such objects as roof lines which occur with panoramas made of pasted-together photographs. In a panoramic picture the image of a straight object such as a roof line often appears as a curved line on the photograph.

The origin of angular distortion is two-fold.

First, the outer portions of an image are magnified as compared to the inner portions, because the film is farther from the optical center of the lens. Referring to FIG. 1, the optical center C of the lens L is the point inside the lens which corresponds to the position of a pin-hole lens producing the same image. The distance from the lens center C to the plane of the sensor-element pixel array SP is clearly greater when the image points are away from the optical axis A.

As in a telephoto lens, which has a long focal length, the image at the corners of the image plane (coinciding with the pixel array SP) is enlarged because the effective focal length of the lens L is greater at the corners than in the center.

Consider the two point objects OP separated by a small angle α. The distance between their image points on the sensor array SP, denoted as image pair IP, is a function of θ. When the two close-set points OP are both near to the optical axis their separation on the film is almost exactly equal to the focal length of the lens times the angular separation between them, measured in radians; but when offset from the axis as illustrated in FIG. 1 their two image points IP will be separated by a greater amount, namely the on-axis distance divided by the cosine of θ.

In other words, the magnification factor is 1/(cos θ). Because the function cosine θ is approximately constant and equal to one in the neighborhood of θ=0°, there is little angular distortion there. But as the off-angle increases, so does distortion.

The second origin of angular distortion has to do with the tilt of the focal or film plane with increasing θ. The distance between the image pair of points IP will move farther apart from one another as θ increases (while the angular separation α of the object pair OP stays constant), but will move apart still faster if the line between them passes through the optical axis, as compared to the case where the line between them is perpendicular to the optical axis. This is because the focal plane is tilted away from the optical axis. In FIG. 1 the dashed line between the pair of image points IP shows that they are in a line extending from the optical axis A.

FIG. 2 shows the extra separation in the radial direction. If the surface of the sensor pixel array SP were tilted perpendicular to the incoming image rays, the distance between would be d; but on account of the tilt their separation is e. Trigonometry gives e=d/(cos θ).

Prior-art electronic cameras have not taken these distortions caused by perspective into account, nor corrected them. In particular, they have provided no way to correlate images from one portion of an image plane with images from another portion. This has prevented the use of electronic cameras to form high-quality composite images.

In particular, prior-art electronic cameras have not electronically displaced the image points in memory as any function of perspective. If a prior-art sensor array were 500 by 500, the data from the pixels has typically been put into a 500 by 500 memory array and/or plotted on a plotter having a 500 by 500 dot matrix The resulting perspective is just like that of a conventional film camera, and images cannot be juxtaposed.

Similarly, prior-art electronic cameras have not provided any way for correcting opticians' distortions, which can also prevent images from juxtaposing with adjacent images properly.

SUMMARY OF THE INVENTION

Accordingly, the present invention has an object, among others, to overcome deficiencies in the prior art such as noted above. A particular object is to provide composite or built-up images from a plurality of sub-images, without distortion (including angle distortion or any other distortion caused by the optical element in front of the pickup sensor, or due to inaccurate placement of the sensor elements).

The invention provides a method for removing angle distortion by adjusting raw sensor data using trigonometric functions, and/or other mathematical treatment, especially as to X-Y location. This permits building up composite images without any distortion.

Making this correction on data derived from a flat image plane will remove angular distortion entirely and mimic the effect of a spherical image plane. Since film comes in sheets and is held flat in a camera, lenses have been designed to focus onto a plane surface, resulting in angular distortion. Some specialized cameras, notably the Schmidt camera, use a spherical film surface and a special lens. A "pinhole" camera also can use a spherical film surface (indeed, a surface of any shape at all). Clearly, the spherical photographs from a Schmidt camera would be fastened at their edges to form a globe constituting an image of the camera's entire surroundings, extending 360° in every direction and totally without distortion (assuming no optician's distortions). The present invention mimics this complete juxtaposability electronically, without requiring unusual lenses or curved sensor arrays.

In the present invention signals from the detector pixels are not simply placed directly into a memory array corresponding point-by-point with the pixel array of the pickup; instead, the signals are trigonometrically adjusted, preferably via a simple computer program, preferably so that there is zero angular distortion. The factors of cosine θ are removed mathematically to reduce or eliminate angle distortion, permitting images to be overlapped at will without discontinuities.

It will be apparent that correction of angular distortion involves multiplying the distance between two image points IP by a factor of (cos θ) if the line joining them is tangent to a circle centered on the optical axis, and multiplying the distance between two image points IP by (cos² θ) if the line between them passes through the optical axis A.

In the case of the flat focal-plane lens L, flat image plane, and rectangular sensor array SP of FIG. 1, the correction is made by finding the radial distance r of each outlying sensor pixel $P_1$ from the point $P_0$ where the optical axis meets the pixel array SP. The coordinate are of course arbitrary, but conveniently may be originated at point $P_0$, which is assigned coordinates (0, 0) while point $P_1$ has coordinates $x_1$, $y_1$, point $P_2$ has coordinates $x_2$, $y_2$, etc.

The correction for any two close-lying image points $P_1$ and $P_2$ is as follows: The radial distance r of the neighborhood of $P_1$ and $P_2$ is determined. This distance could be the distance of either one, the mean average of their radial distances, etc. From r the angle θ is easily found; by geometry, θ=arctangent (r/f), where f is the focal length of the lens. To correct for the magnification effect the distance between the two points, i.e.

$$[(x_2-x_1)^2+(y_2-y_1)^2]^{1/2},$$

is multiplied by cos θ.

The position of any pixel element or point P in the plane of the sensor array SP cannot be described only in terms of r; two coordinates are needed. Circular coordinates, r and φ, are most natural. In these r is again the radial distance and φ is the angle measured from some line lying on the plane of the sensor array SP. The distance along the direction of the angle φ, denoted as the tangential distance, is equal to rφ for close-set points. Of course, rectangular coordinates x and y are easily converted to circular coordinates, and conversely back again, by standard formulas.

The initial multiplication by the factor (cos θ) has already accounted for the magnification, but an extra correction in the r direction is still needed because the radial distance varies as cos² θ, not cos θ.

To complete the correction the difference in radial distance between the points $P_1$ and $P_2$, denoted Δr, is found as a first step. This difference is multiplied by cos θ, so that the radial separation between the points is now corrected by a factor of cos² θ, while the tangential separation is corrected by a factor of cos θ. This completes the transformation from a planar image with angle distortion to an undistorted image which can be plotted directly onto a spherical, rather than a flat, surface.

Angular distortion is only one type of distortion, and with the present invention any other lens distortions can be removed by computer means if the distortion is geometrical and its function is known.

In the general case the distortion is given by a function of the following form:

$$F=g(x,y),$$

where x and y are the coordinates of the point in the lens image plane, g is a general function, and F is the amount of distortion. (F need not be a vector quantity; due to radial symmetry of the lens, the direction of distortion can be taken as radial from the center point at the intersection of the optical axis and the image plane.)

In the case of a moving lens the x and y values of a certain pixel on the sensor surface are calculated using the following formulae:

$$x'=X+x,$$

$$y'=Y+y,$$

where X and Y are the magnitude of movement generated by the moving element and (x,y) are the pixel coordinates on the CCD surface in respect to the center point.

In the present invention the mathematical transformation corresponds to a map projection in which points are plotted onto the plane of the map by straight rays from the center of the globe which rests on the plane, the rays passing through points on the globe to the corresponding points on the map. (Since the invention transforms the other way, it is more precisely the inverse of this map transformation.)

Because in the present invention the data is all mapped onto a virtual sphere, the present invention will allow the juxtaposition of data sets obtained from two cameras pointed different ways, or from one camera set with its optical axis pointing in two different directions sequentially. The entire surroundings of the camera, round 360°, can be stored in memory.

It is well known to map makers that a sheet of paper cannot cover a portion of a sphere without folding, and this is the reason for distortion of area, shape, or angle in maps of the globe. For this reason the virtual map of the invention can only be printed out or televised exactly onto a spherical surface. However, any portion of the stored virtual spherical image can be plotted, printed, or displayed on a flat surface merely be reversing the algorithms used to generate it.

Thus, a virtual globe or star map could be generated in memory with conventional lenses and video pickup sensor arrays, using only a small number of cameras or a small number of exposures with one camera.

Furthermore, a small movable sensor array can be used, in the manner of Smith, to generate an image without angle distortion. This reduces the cost of the array, and does not harm the image quality since the virtual data picture can be built up while scanning.

Still further, the data from two of more cameras with movable sensor arrays (or alternatively a single-pixel sensor element) can be correlated so that one single virtual image is generated.

Preferably, the lens is movable for simpler wiring although a movable detector is also adaptable to the present invention. Except when the objects to be imaged are very close to the lens, there is little difference in the resulting images between a camera with a movable lens and one with a movable sensor array.

The present invention corrects for any distortion at all, including opticians' distortions in which straight objects have curved images. Therefore the invention permits recording of high-quality images with the use of less-expensive lenses, as well as juxtaposing several such images without border mis-matches.

The present invention can also correct for intentional or designed-in distortions. For example, an extreme wide-angle "fish-eye" lens, covering an angle of 180°, produces a round image rather than a rectangular image, and introduces severe distortion. The horizon, which of course appears straight to the naked eye, becomes an enclosing circle on the fish-eye image plane when the optical axis is aimed at the zenith, and is strongly curved whenever the axis is not horizontal. The present invention can transform such a distorted image into an un-distorted, virtual hemispherical image from which any portion can be transformed back into a plane picture, but without distortion.

The present invention can act as a "virtual view camera", changing the apparent perspective from one plane image to a second plane image with software corresponding to the independent tilts and swings of a view-camera's lens holder and film holder.

BRIEF DESCRIPTION OF THE DRAWING

The above and other objects and the nature and advantages of the present invention will become more apparent from the following detailed description of an embodiments taken in conjunction with drawings, wherein.

DETAILED DESCRIPTION OF THE PREFERRED EMBODIMENT

Here, and in the following claims:

"Computer" means a CPU, microprocessor, personal computer, or any machine capable of acting on instructions ("software")

"Juxtaposing" two real images or image portions means causing overlapping areas of the two images to coincide.

"Mapping" means transforming points of a first surface onto points of a second surface, either by mathematical calculation (for example, transforming pixels in a plane rectangle onto a virtual sphere in a computer memory), by forming a real image from a physical object (with a lens), or by some equivalent means.

"Photo-electronically detecting an image" means using some apparatus for transforming an optical real image into image data, an electronic virtual image (for example in a memory), or an electronic real image such as a CRT or LED display screen. Typically the apparatus for photo-electronically detecting an image will include a light sensor or sensor array coinciding with the focal plane (or another, non-planar focal surface) of a lens, where the sensor is either fixed or relatively movable in the focal plane; but it also includes more round-about conversions of a real image into an electronic virtual image, such as for example scanning an ordinary light-activated-chemical film photograph into a computer memory, using a scanner.

"Real image" means an image that can be viewed by a person, for example, a television screen image (real display image), the real image formed by a lens which can expose a photographic film, and so on.

"Virtual electronic image" means an image which is stored or realized electronically in the form of data, where the data includes image point (pixel) light values and position coordinates.

"Virtual sphere" means a set of data or signals (serial or parallel) in which each datum is associated with two spherical coordinates (for example, angular coordinates $\theta$ and $\phi$ for a sphere of fixed radius r), or with two coordinates which can be transformed into spherical coordinates. A virtual electronic spherical image is a data set or set of signals representing pixels each with a least one light datum and two coordinates, where the coordinates are spherical coordinates.

"Virtual surface" means a set of two coordinates on a pre-defined surface (for example, a sphere of fixed radius r), or a set of three coordinates representing a surface in space.

Figures 1, 2:
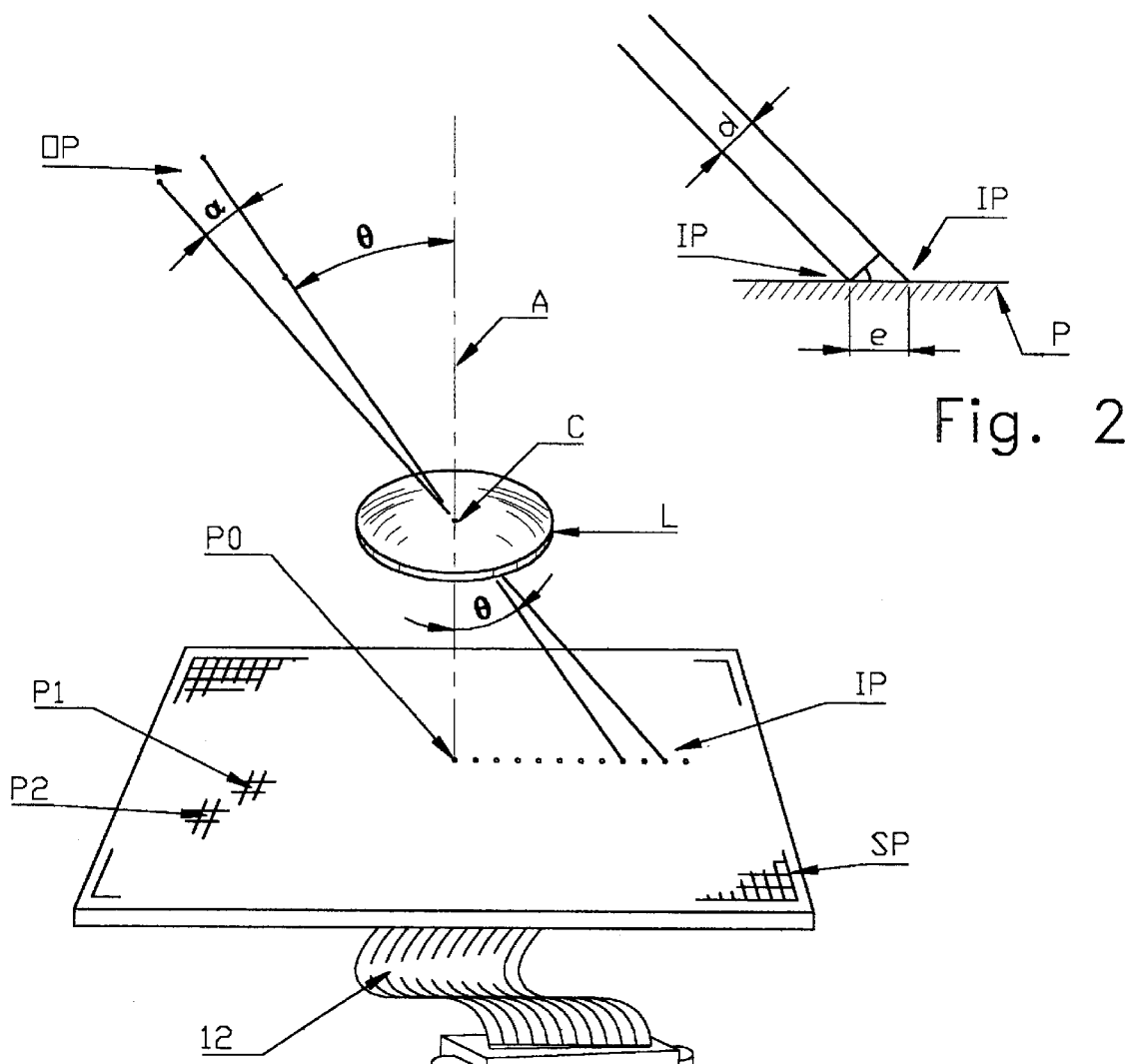
FIG. 1 is a partially schematic perspective view of a photoelectric detector.
FIG. 2 is a graphical detailed view according to FIG. 1.

FIG. 1, as discussed above, shows the general geometry of the invention. The lens L focusses onto a planar photodetector or sensor array SP from which data signals indicating the light intensity (and/or color) at each pixel element or sensor unit P are sent over the data line 12. The sensor array SP may include, for example, rows and columns of CCD light-detecting devices.

The lens L preferably scans laterally (translates) in directions indicated by arrows D over the sensor array SP. No mechanism for translating the lens is illustrated in FIG. 1, but the motion of the lens in FIG. 1 would be, for example, left or right, so that the lens L maintained the correct focal distance from the plane of the array SP. (The distance could be appropriately varied, for example by an auto-focusing device).

Figure 4:
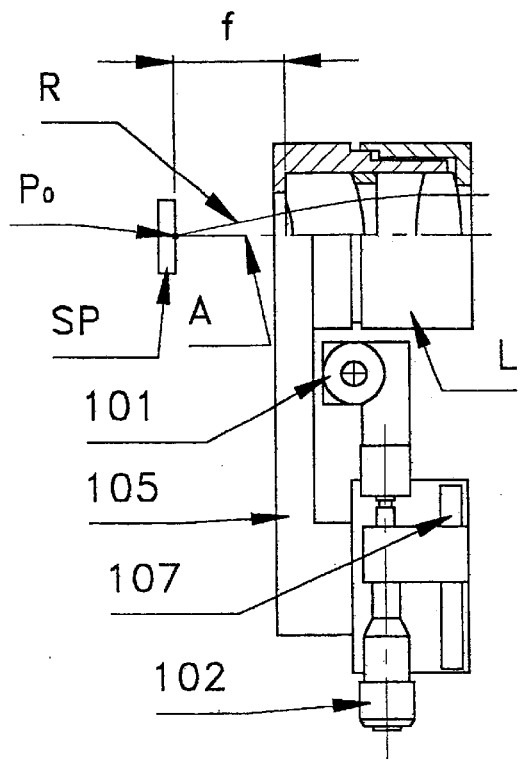
FIG. 4 is a partially cross-sectional plan view.

FIG. 2 shows a photo-electronic detector 1 with a lens-translation mechanism including an X-translator 101 and a Y-translator 102. Both translators may be of the micrometer-screw type with finger-turned barrels, as illustrated, but may take any form and may include step motors, controllers, or other automatic driving means. The optical axis of the lens L is perpendicular to the paper in FIG. 2; FIG. 4 shows a similar arrangement with the optical axis lying in the plane of the paper.

Figure 3:
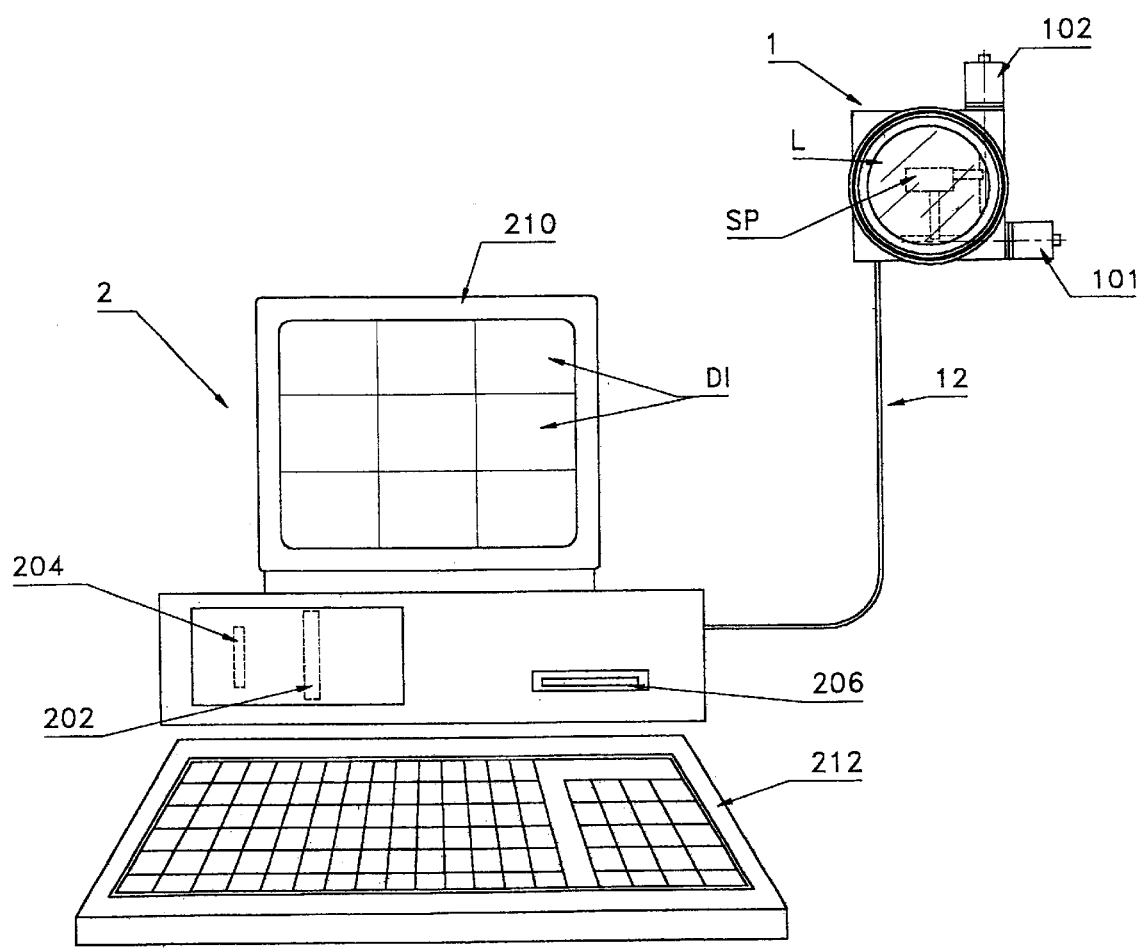
FIG. 3 is a partially schematic perspective overview of the invention.

The translators 101 and 102 move the lens L within the plane of the paper in the illustration of FIG. 3, so that the real image formed by the lens L translates over the array SP, which is visible through the lens L in FIG. 3. When the lens L translates the image on the array SP translates.

Image data from the array SP is sent over the data line 12, which may be a bus, cable, or any other data conductor, to a transformation and display device, such as an ordinary personal computer 2. The computer 2 preferably includes a frame grabber 202, a CPU chip 204, a drive accepting a diskette 206, a display screen 210, and a keypad 212.

The incoming data from the line 12 is stored in a virtual array formed in memory by the frame grabber 202. The stored data conventionally will be in a rectangular format, like the sensor cells of the detecting array SP. The cell or pixel locations are indexed with X- and Y-coordinates.

Software downloaded from the diskette 206 is used by the CPU 204 to transform the rectangular-coordinate data set into spherical coordinates and remove distortion.

As described in the Summary above, in the data set the virtual distance between adjacent off-axis points in the is reduced according to the distance from the optical axis and the orientation of the points.

Preferably, the computer as driven by the software sets up a memory area into which light amplitude and/or color data can be stored. Each record of this area is preferably indexed by spherical coordinates, for example $\theta$ and $\phi$, indicating the azimuthal and elevational angle from the center of a sphere.

The transformation may map one or more rectangular-coordinate pixels into a spherical-coordinate pixel as follows: the $\phi$ coordinate is obtained by taking the arctangent ($\tan^{-1}$) of the X/Y, where X and Y are the coordinates in the rectangular-indexed data set; the $\theta$ coordinate is equal to the arctangent of r/f, where $r=[X^2+y^2]^{1/2}$ and f is the lens focal length.

Due to the finite size of the discrete pixels in the sensor array SP, and the corresponding virtual size of the rectangular data in the computer 2, the mapping from rectangular pixels to spherical pixels will not be one-to-one. In case one spherical pixel includes portions of several rectangular pixels, the software will preferably interpolate the light intensity and/or color values, for example by weighting the values of the adjoining rectangular pixels according to their areas which are projected by the transformation onto one pixel of the virtual sphere.

The data line 12 preferably sends information regarding the position of the lens L relative to the array SP, so that the point where the optical axis of the lens L meets the plane of the sensor array SP can be determined. This information is needed for transforming the data in embodiments in which the lens L or the array SP is movable.

The present invention contemplates overlapping of images acquired by the grabber 202. Two or more grabbed images can come about by adjustment of the translators 101 and 102, which move the lens L and cast a different real image onto the area of the array SP; and/or by changing the angle of the optical axis of the lens L.

In some cases images can be juxtaposed by aligning a pair of adjacent edges of two rectangular images from the array SP; and a series of such aligned images can be used to map out a band on the virtual sphere of transformed pixels. But this is not the general case.

There is no way that a sphere can be "papered" with rectangles, so overlapping of images with conventional rectangular arrays SP is inevitable.

Optionally, the software creates a set of domains, preferably based on a projection of one of the platonic solids onto a sphere; these projections are the only ones which can divide a sphere into area which are all congruent, with the same shape and size. One example of domains based on a platonic projections is a soccer ball.

Preferably, the software will use a different set of spherical coordinates for each such domain. This will avoid crowding and dispersion of pixels when the angles $\theta$ and $\phi$ are incremented by equal amount.

The software may include a search algorithm for juxtaposing two virtual images, and/or for correlating the spherical coordinates of adjoining domains and transformed images.

The software may also include an algorithm for adjusting the magnitude data indicating the light intensity of each pixel. The reason for this is that the light is more dispersed away from the optical axis (see for example FIG. 1) due to the increased effective focal length, and the illumination is less. Also, most lenses pass less light at an angle than straight along the optical axis, because the projection of the central diaphragm is elliptical at off-axis angles. To avoid illumination discontinuities, the off-axis intensity value can be adjusted.

In case any discontinuities remain between juxtaposed regions of the virtual spherical image, a smoothing algorithm can be used to remove the discontinuities.

Once the undistorted virtual spherical image has been constructed, it may be deconstructed into a plane image using the inverses of some of the same algorithms used to construct the spherical virtual image.

FIG. 2, which is exemplary, shows the display screen 210 covered by nine segments DI, each corresponding to one portion of the virtual sphere. These segments DI may, or may not, correspond to different data sets grabbed by the grabber 202 and transformed by the CPU 204.

FIG. 4 shows the lens L and translators 101 and 102 mounted on a movable translation frame 105. The optical axis A, a light ray R, and the focal length f are shown. An X-Y sensor 107 detects the position of the lens axis A relative to the fixed array SP, so that the computer 2 can incorporate the position of the $P_0$ on the array SP into the transformation calculations.

Figure 5:
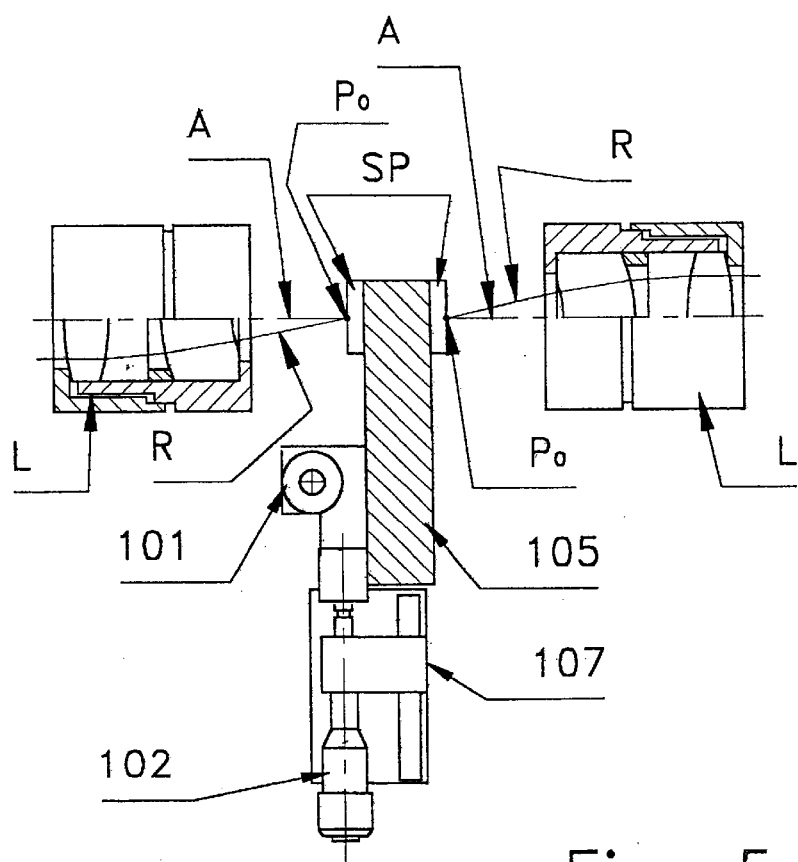
FIG. 5 is similar to FIG. 4 but shows a different embodiment.

FIG. 5 shows an arrangement using two fixed lenses L and a double-sided array SP. If the lenses L are wide-angle, such an arrangement can very nearly cover the entire surface of the virtual sphere with transformed image points; and if the lenses are "fish-eye" lenses covering at least 180° each, the coverage is complete. The additional distortions of a fish-eye lens are corrected by additional software, which will be specific to the lens.

Figure 6:
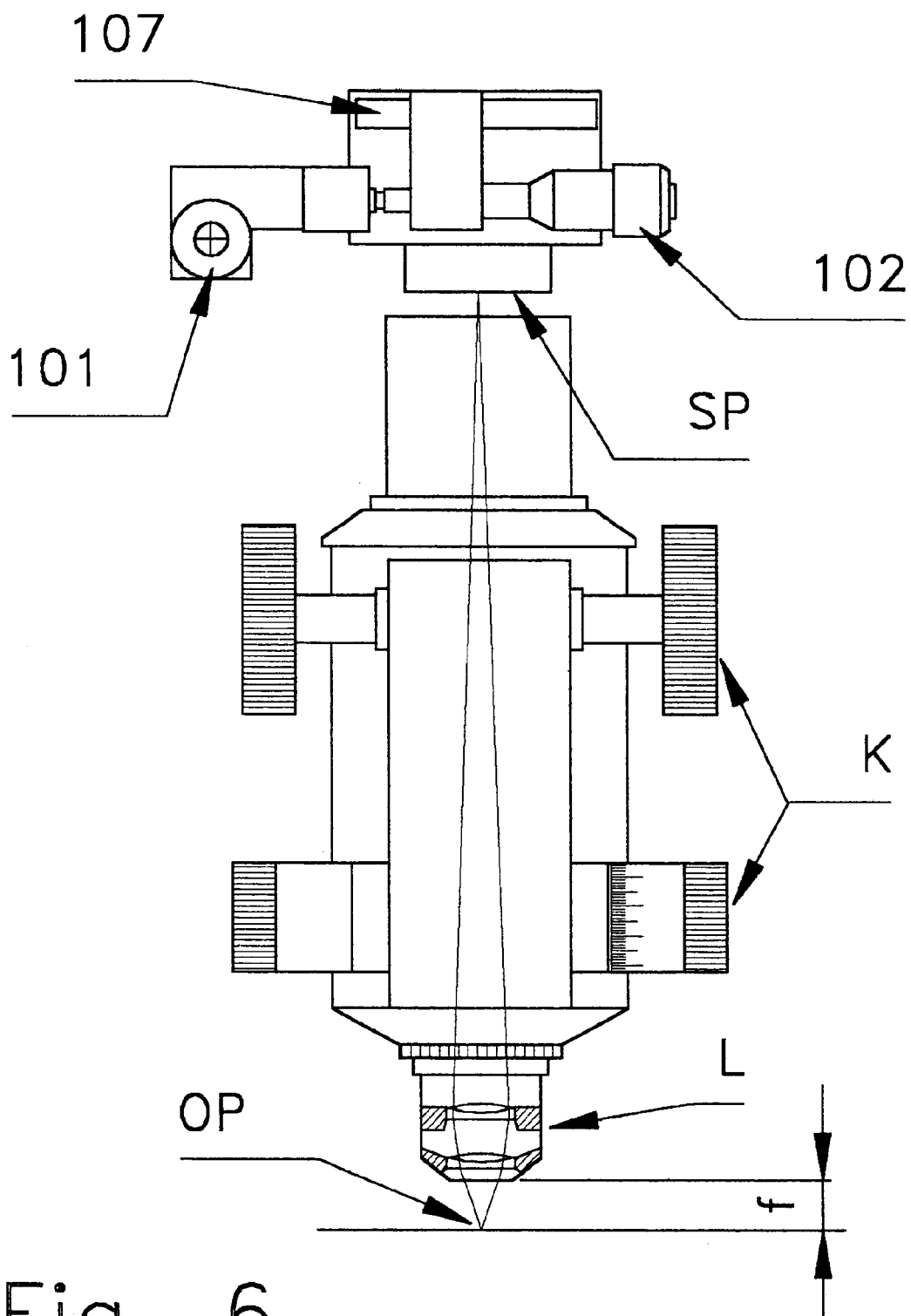
FIG. 6 is an elevational view.

FIG. 6 shows a microscope embodiment of the present invention, with coarse and fine focussing adjustment knobs K.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments is disclosed in the specification above; and it is intended that such expressions be given their broadest interpretation.

What is claimed is:

1. A method for generating composite images, comprising:
   providing a lens and a photo-detector array, wherein the lens has an optical axis and includes an image formation area larger than an array area;
   effecting relative movement between the lens and the array in translation in a direction perpendicular to the optical axis of the lens;
   photo-electronically detecting a first image;
   mapping the first image onto a first portion of a virtual surface;
   photo-electronically detecting a second image;
   mapping the second image onto a second portion of the virtual surface; and
   juxtaposing the first portion of the virtual surface and the second portion of the virtual surface to create a coherent virtual image.

2. The method according to claim 1, wherein the first image and the second image are distorted, wherein the steps of mapping correct the distortion, and wherein the image on the virtual surface is not distorted.

3. The method according to claim 2, wherein the virtual surface comprises a virtual sphere.

4. The method according to claim 3, comprising steps of
   providing a first lens and a second lens having a common optical axis,
   providing a first photodetector and a second photodetector parallel to the first photodetector and arranged back-to-back with the first photdetector, and
      wherein the first lens and the second lens move together over the first photodetector and the second photodetector.

5. The method according to claim 4, wherein the first lens and the second lens include wide-angle lenses.

6. The method according to claim 1, comprising mapping the image from the virtual surface onto a real display image.

7. The method according to claim 1, wherein the virtual surface comprises a virtual sphere.

8. The method according to claim 2, wherein the distorted image comprises a plane image.

9. The method according to claim 2, wherein the distortion includes opticians' distortion.

10. The method according to claim 1, comprising mapping the image from the virtual surface onto a real display image.

11. The method according to claim 1, comprising Juxtaposing a plurality of portions of the virtual surface into a spherical virtual surface.

12. The method according to claim 1, wherein the virtual surface comprises a virtual sphere, wherein the distorted image comprises a plane image, and wherein the step of mapping comprises mapping adjacent points such that
   decreasing a tangential separation between the points by $\cos \theta$ and decreasing a radial separation between the points by $\cos^2 \theta$, where $$\theta = \cos^{-1}(r/f);$$

wherein r is a radial distance, within the focal plane, from an optical axis of a lens to one of the adjacent points, and wherein f is a focal length of the lens.

13. Apparatus for correcting real image distortions, comprising:
   a photo-electronic detector for detecting a distorted image; and
   a processor mapping the distortion image onto at least a portion of a virtual surface;
      wherein the image on the virtual surface is not distorted and the detector comprises a lens having an optical axis and a pixel array which are relatively movable for translating a real lens image over the pixel array in a direction perpendicular to the optical axis of the lens.

14. The apparatus according to claim 13, wherein the pixel array is rectangular and plane, and wherein the virtual image is spherical.

15. The apparatus according to claim 13, wherein the processor comprises a computer and the computer includes software mapping the distorted image onto at least a portion of a virtual surface when loaded into the computer.

16. A transportable storage medium incorporating the software of claim 13.

17. The apparatus according to claim 13, wherein the software causes the computer to calculate a transformation mapping from planar to spherical coordinates.

18. A transportable storage medium incorporating the software of claim 17.

* * * * *